United States Patent
Kamiya

(10) Patent No.: US 7,956,720 B2
(45) Date of Patent: Jun. 7, 2011

(54) REMOTE CONTROL SYSTEM FOR A VEHICLE

(75) Inventor: Masachika Kamiya, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 935 days.

(21) Appl. No.: 11/518,215

(22) Filed: Sep. 11, 2006

(65) Prior Publication Data

US 2007/0069854 A1 Mar. 29, 2007

(30) Foreign Application Priority Data

Sep. 26, 2005 (JP) ................................ 2005-278536

(51) Int. Cl.
G05B 19/02 (2006.01)
B60R 25/10 (2006.01)
G08B 1/08 (2006.01)
H04M 11/00 (2006.01)
H04B 1/02 (2006.01)

(52) U.S. Cl. .................... 340/4.3; 340/7.39; 340/426.14; 340/539.19; 340/5.23; 340/13.21; 455/408; 455/419; 455/92; 455/151.1

(58) Field of Classification Search .................. None
See application file for complete search history.

(56) References Cited

U.S. PATENT DOCUMENTS

| | | | | |
|---|---|---|---|---|
| 4,663,626 A | * | 5/1987 | Smith | 340/825.69 |
| 5,469,152 A | * | 11/1995 | Yamamoto et al. | 340/825.63 |
| 5,952,933 A | * | 9/1999 | Issa et al. | 340/5.26 |
| 6,567,012 B1 | * | 5/2003 | Matsubara et al. | 340/825.72 |
| 6,744,349 B1 | * | 6/2004 | Asakura et al. | 340/5.62 |
| 7,215,238 B2 | * | 5/2007 | Buck et al. | 340/5.23 |
| 7,394,350 B2 | * | 7/2008 | Yoshida et al. | 340/426.11 |
| 2004/0212478 A1 | * | 10/2004 | Kutsuzawa et al. | 340/5.6 |
| 2005/0024255 A1 | * | 2/2005 | Chuey | 341/176 |

FOREIGN PATENT DOCUMENTS

| | | |
|---|---|---|
| JP | 2002-242503 | 8/2002 |
| JP | 2002-339609 | 11/2002 |
| JP | 2003-341480 | 12/2003 |
| JP | 2004-107959 | 4/2004 |
| JP | 2004-250965 | 9/2004 |
| JP | 2005-207110 | 8/2005 |

OTHER PUBLICATIONS

Japanese Office Action dated May 12, 2009.
Japanese Office Action for JP 2005-278536 dated Feb. 10, 2010.

* cited by examiner

*Primary Examiner* — Davetta W Goins
*Assistant Examiner* — Fekadeselassie Girma
(74) *Attorney, Agent, or Firm* — Finnegan, Henderson, Farabow, Garrett & Dunner, LLP

(57) ABSTRACT

A remote control system for a vehicle is disclosed. The system comprises a mobile device that transmits a signal ordering the vehicle to perform an opening operation, and an in-vehicle electronic device that performs the opening operation in response to the signal. In the system, the in-vehicle electronic device includes a determination part that determines whether a manipulation mode of the mobile device should be set; and a setting part that sets the manipulation mode of the mobile device in accordance with the determination result.

7 Claims, 3 Drawing Sheets

_US 7,956,720 B2_

REMOTE CONTROL SYSTEM FOR A VEHICLE

BACKGROUND OF THE INVENTION

1. Field of the Invention

The present invention generally relates to a remote control system for a vehicle, and especially relates to such systems in which locking/unlocking devices provided at car doors or a car trunk can be remotely locked or unlocked.

2. Description of the Related Art

A remote keyless entry system (RKE) is known in the automobile technical fields, in which car doors can be remotely locked and unlocked by manipulating a remote device including a radio transmitter. Some of such remote devices have a trunk opening function that can open a car trunk remotely. A car trunk, however, cannot be remotely closed and locked after being opened. Therefore, it is desired to avoid mismanipulation of the remote device. One scheme for preventing the mismanipulation of the remote device requires a switch of the remote device to be pressed for a certain long time to open the car trunk. In this scheme, at default setting, the remote device operates only when its switch is pressed for one second or more, that is, in a "long pressing" manner.

The long pressing manner is, however, inconvenient to some users. Therefore, dealers are allowed to modify the long pressing manner to be a short pressing manner by using a special tool at a user's request. But users have to go to the dealer to ask them to change the pressing manners.

If such a long pressing manner requires users to press the switch for too long a time, it may make the users uncomfortable. One prior technology to avoid such uncomfortableness is described in Japanese Patent Laid-Open No. 2002-229609, in which a remote device transmits an order signal to an in-vehicle device only when two conditions are met, that is, only when a signal is detected by a signal detection sensor and a manipulation switch is manipulated on the remote device.

However, these known technologies have the following problems.

In the prior remote keyless systems for opening a car trunk, for example, user's convenience and mismanipulation prevention are contrary to each other. If it is required to press a switch for a long time in order to prevent mismanipulation, that long pressing may be inconvenient for users. Car manufactures cannot grasp, due to the variety of users' tastes, how long the switch should be pressed to provide comfort for users.

Another scheme is to prepare a switch for changing between the "long pressing mode" and the "short pressing mode" depending on user's taste. This scheme needs additional space for arranging the switch, resulting in an increase in cost.

SUMMARY OF THE INVENTION

Accordingly, the present invention is made in view of the above-mentioned problems, and aims at offering a remote control system for a vehicle which can automatically select either "a long pressing mode" or "a short pressing mode" depending on the user's taste.

According to one aspect of the present invention, a remote control system for a vehicle is disclosed. The system comprises a mobile device that transmits a signal ordering the vehicle to perform an opening operation, and an in-vehicle electronic device that performs the opening operation in response to the signal. In the system, the in-vehicle electronic device comprises a determination part that determines whether a manipulation mode of the mobile device should be set; and a setting part that sets the manipulation mode of the mobile device in accordance with the determination result.

In this manner, the manipulation mode of the mobile device can be set when the manipulation mode is required to be set.

In the remote control system, the opening operation may be trunk opening operation. It is possible to reduce mismanipulation when opening the trunk.

In the remote control system, the determination part may determine whether the manipulation mode of the mobile device should be set, based on whether a battery has been remounted or reconnected.

In the remote control system, the mobile device may comprise a wireless code generating and transmitting part that transmits wireless codes including a start signal and a stop signal, in response to pressing a switch of the mobile device; and the setting part may set the manipulation mode of the mobile device, based on a time duration of pressing the switch.

In the remote control system, the in-vehicle electronic device may comprise a wireless code determination part that determines wireless codes transmitted by the mobile device; and the setting part may calculate the time duration of pressing the switch of the mobile device, based on the determination result of the wireless code.

According to an embodiment of the present invention, a remote control system for a vehicle can be provided, in which it is possible to automatically select either "a long pressing mode" or "a short pressing mode" depending on the user's taste.

DESCRIPTION OF THE PREFERRED EMBODIMENTS

In the following, embodiments of the present invention are described with reference to the accompanying drawings.

Figure 1:
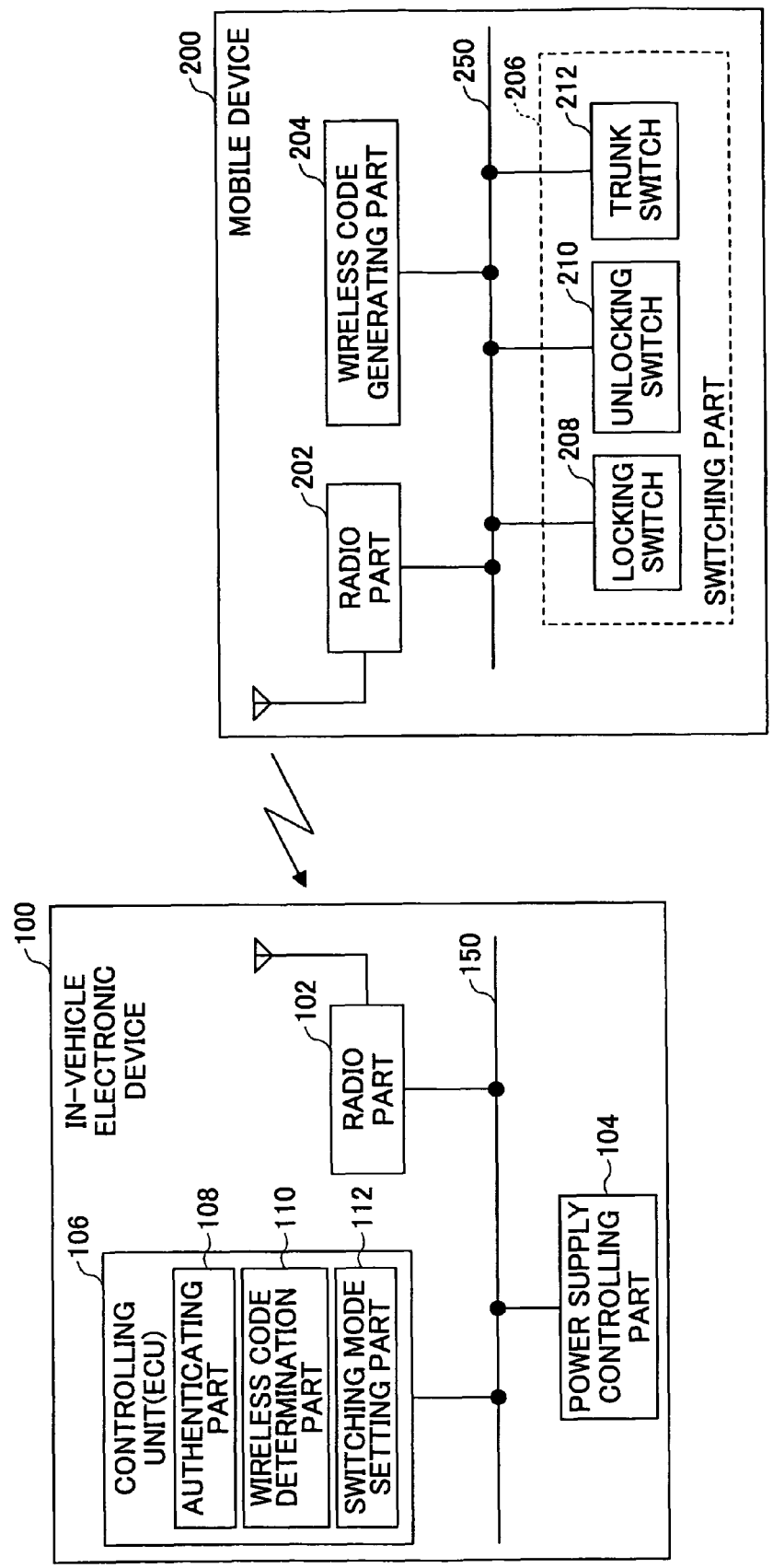
FIG. 1 generally shows a remote control system for a vehicle according to an embodiment of the present invention.

FIG. 1 generally shows a remote controlling system for a vehicle according to an embodiment of the present invention. The remote controlling system according to the embodiment comprises an in-vehicle electronic device 100 and a mobile device 200.

First, the in-vehicle electronic device 100 is explained. The in-vehicle electronic device 100 is mounted on a car, and comprises a radio part 102 equipped with an antenna, a power supply controlling part 104, and a controlling unit (Electronic Control Unit) 106. The controlling unit 106 comprises an authenticating part 108, a wireless code determination part 110, and a switching mode setting part 112 as means for determining and setting. The radio part 102, the power supply controlling part 104, and the controlling unit 106 are connected together via a bus 150.

The radio part 102 receives weak radio wave transmitted by the mobile device 200, and detects information in the received weak radio wave. The detected information includes wireless codes such as an identification code and function codes. The detected information is input to the controlling unit 106.

The power supply controlling part 104 drives a power supply relay (not shown). The power supply controlling part 104 detects or determines whether a battery is remounted or a battery's terminals are reconnected, and inputs the detection result to the controlling unit 106.

The authenticating part 108 authenticates the input identification code. For example, the authenticating part 108 authenticates whether the input identification code is equal to the predetermined identification information unique to the car.

Figure 2:
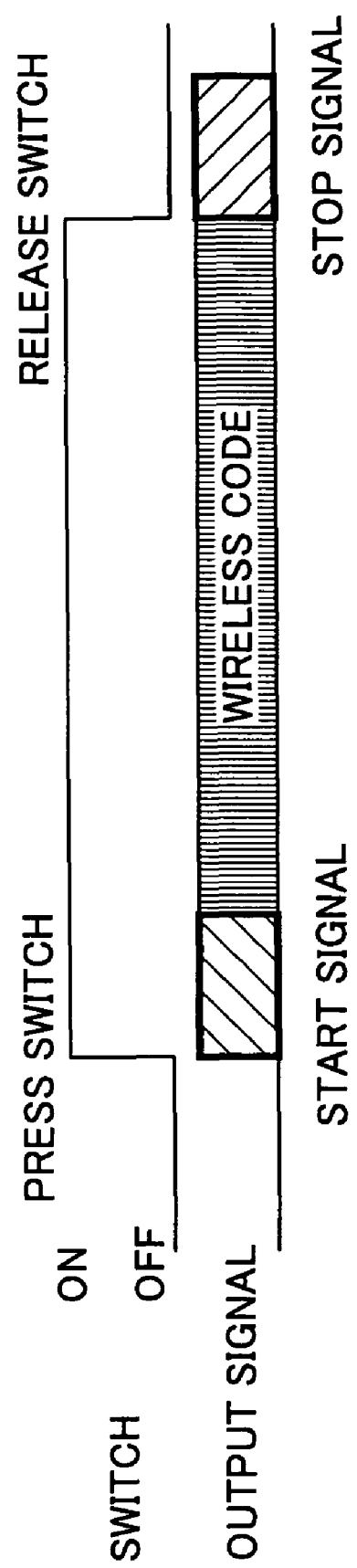
FIG. 2 illustrates wireless codes transmitted by a mobile device according to the embodiment of the present invention.

The wireless code determination part 110 determines the wireless codes transmitted by the mobile device 200. For example, if a user presses or pushes a trunk switch 212 (explained later) of the mobile device 200, the mobile device 200 transmits a start signal as shown in FIG. 2. The mobile device 200 transmits a request signal (wireless code) following the start signal. Then, if the user releases or unpresses the trunk switch, the request signal transmission is stopped and a stop signal is transmitted.

When the wireless code determination part 110 receives the start signal for the wireless code, it starts a counting timer (not shown). When receiving the stop signal, the wireless code determination part 110 stops the timer. When the wireless code transmission from the mobile device is stopped, the wireless code determination part 110 supplies information indicating a time duration from the start signal reception to the stop signal reception, into the switching mode setting part 112.

Based on the information indicating the time duration from the start signal reception to the stop signal reception, the switching mode setting part 112 selects and sets either one of "a switch short pressing mode" and "a switch long pressing mode"; for example, when the time duration from the start signal reception to the stop signal reception is longer than a predetermined threshold (t), the switching mode setting part 112 sets the "switch long pressing mode". When the time duration from the start signal reception to the stop signal reception is shorter than or equal to the predetermined threshold (t), the switching mode setting part 112 sets the "switch short pressing mode".

Next, the mobile device 200 is explained.

The mobile device 200 comprises a radio part 202, a wireless code generating part 204, and a switching part 206. The switching part 206 comprises a locking switch 208, an unlocking switch 210, and a trunk switch 212. The radio part 202, the wireless code generating part 204, the locking switch 208, the unlocking switch 210 and the trunk switch 212 are connected together via a bus 250.

The radio device 202 transmits a weak radio wave to the car in response to the user's manipulation of the switching part 206. The weak radio wave contains wireless codes such as an identification code and function codes.

The locking switch 208 is pressed in order to lock car doors.

The unlocking switch 208 is pressed in order to unlock the car doors.

The trunk switch 210 is pressed in order to open a car trunk.

The wireless code generating part 204 generates function codes corresponding to the switches respectively and inputs them to the radio part 202, in response to the user's manipulation of the switching part 206.

For example, if the wireless code generating part 204 detects that the user of the mobile device 200 presses a switch by manipulating the switching part 206, it transmits a code (a start signal) indicating that the switch has been pressed, to the in-vehicle electronic device 100.

If the wireless code generating part 204 detects that the switch is un-pressed or released, it transmits a code (a stop signal) indicating that the switch has been un-pressed or released, to the in-vehicle electronic device 100. Therefore, the wireless code generating part 204 generates the start signal and the stop signal before and after the request signal respectively. As a result, the radio part 202 transmits the start signal, the request signal and the stop signal in this order. The wireless code generation part 204 and the radio part 202 can be integrated into one generating and transmitting part.

Figure 3:
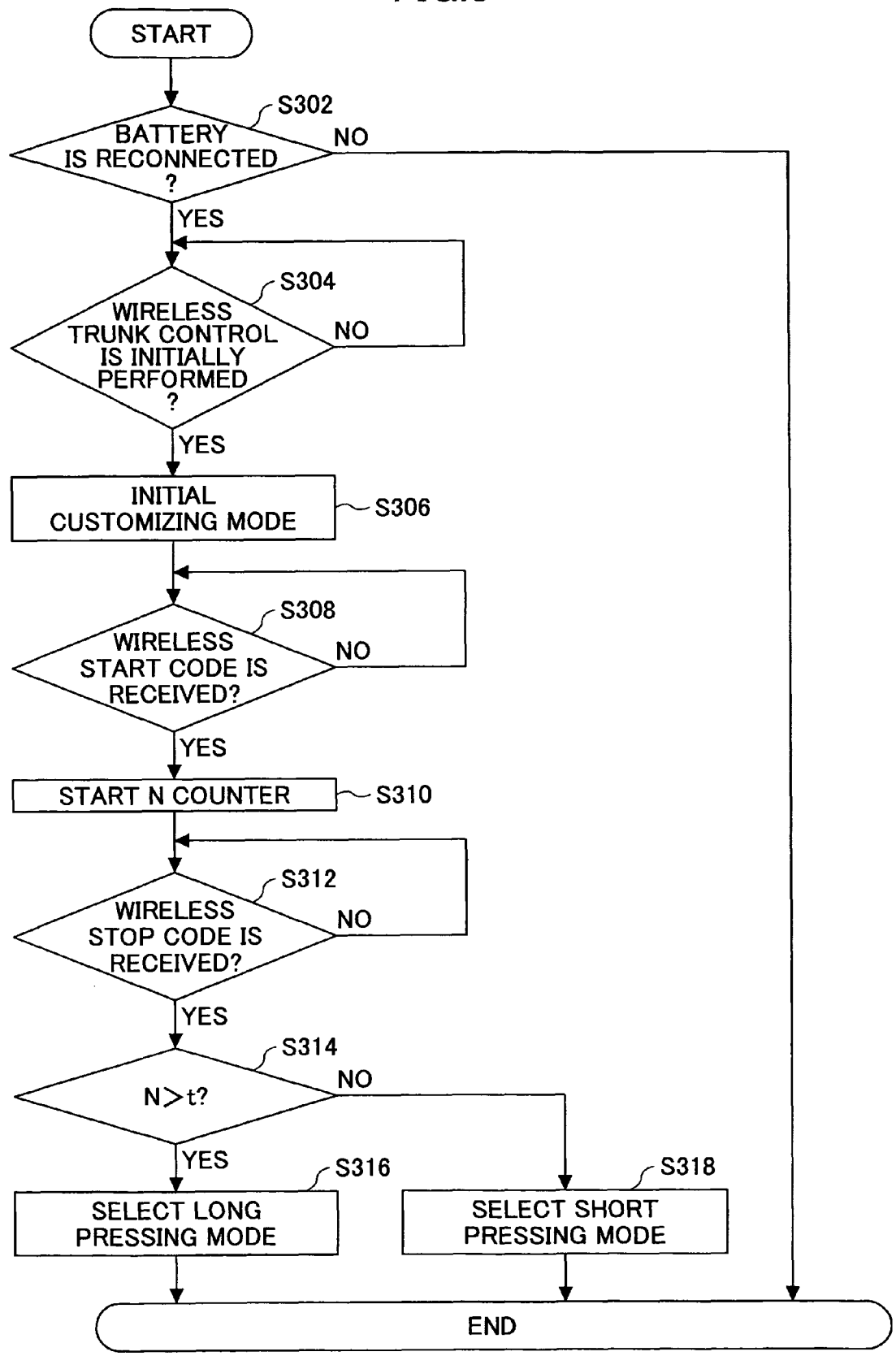
FIG. 3 is a flowchart illustrating a procedure for operation of the remote control system according to the embodiment of the present invention.

An operations procedure of the in-vehicle electronic device 100 according to the embodiment is explained with reference to FIG. 3.

After starting, the power supply controlling part 104 determines whether a battery has been removed and remounted at step S302. Alternatively, the power supply controlling part 104 can determine whether the terminals of the battery have been reconnected.

If the battery has not been removed or its terminals have not been reconnected (NO at step S302), the procedure ends. If the battery has been removed and re-mounted or its terminals have been reconnected (YES at step S302), the procedure goes to step S304 where the switching mode setting part 112 determines whether the wireless trunk is being controlled for the first time.

If the wireless trunk control operation is not the initial one (NO at step S304), the procedure goes back to step S304. On the other hand, if the wireless trunk control operation is the initial one (YES at step S304), the switching mode setting part 112 sets an initial customizing mode at step S306.

Next, the wireless code determination part 110 determines whether the wireless start code (the start signal) has been received at step S308.

If the wireless start code has not been received (NO at step S308), the procedure goes back to step S308. On the other hand, if the wireless start code has been received (YES at step S308), the wireless code determination part 110 activates the timer and starts the counting at step S310.

Then, the wireless code determination part 110 determines whether the wireless stop code (the stop signal) has been received at step S312.

If the wireless stop code has not been received (NO at step S312), the procedure goes back to step S312. On the other hand, if the wireless stop code has been received (YES at step S312), the switching mode setting part 112 calculates a time duration (N) from the wireless start code reception to the wireless stop code reception. Then the switching mode setting part 112 compares the calculated time duration (N) with a predetermined threshold (t), and determines whether N>t holds at step S314.

If N>t, that is, the time duration (N) from the wireless start code reception to the wireless stop code reception is larger than a predetermined threshold (t) (YES at step S314), the switching mode setting part 112 sets a switch operation (pressing) mode or a manipulation mode for opening a trunk to the long pressing mode. On the other hand, if not N>t, that is, the time duration (N) from the wireless start code reception to the wireless stop code reception is smaller than or equal to the predetermined threshold (t) (NO at step S314), the switching mode setting part 112 sets the switch operation (pressing) mode or the manipulation mode for opening the trunk to the short pressing mode.

According to the embodiment of the present invention, in a remote control system for a vehicle in which a trunk opening operation is controlled by pressing a switch of a mobile device, a switch pressing mode or manipulation mode can be optionally set as either of a long pressing mode or a short pressing mode, thereby a user can open the trunk in his/her favorable switching operation manner.

The switch pressing mode or manipulation mode can be automatically customized to the long or short pressing mode when a battery is initially connected or reconnected, and the customized mode can be stored in the remote control system for vehicle.

Although the present invention is explained based on the embodiment thereof, it is not limited to the above embodiment, but various variations and modifications may be made without departing from the scope of the present invention. Some of such variations and modifications are explained below.

Although the trunk opening operation is explained as an example in the above embodiment, the present invention can be applied to other applications such as sliding door operations or back door operations.

Although the customization is done when the battery is initially connected or reconnected in the above embodiment, the customization according to the present invention can be automatically performed not only at the time of connecting a battery but also at other occasions.

INDUSTRIAL APPLICABILITY

The present invention can be applied to wireless remote control systems for vehicles such as automobiles.

The present application is based on Japanese Priority Application No. 2005-278536 filed on Sep. 26, 2005 with the Japanese Patent Office, the entire contents of which are hereby incorporated by reference.

What is claimed is:

1. A remote control system for a vehicle, the system including a mobile device that transmits a signal ordering the vehicle to perform an opening operation and an in-vehicle electronic device that performs the opening operation in response to the signal, the in-vehicle electronic device comprising:
 a determination part that determines whether a manipulation mode of the mobile device should be set, wherein the manipulation mode is one of a long pressing mode and a short pressing mode; and
 a setting part that sets the manipulation mode of the mobile device; wherein when a predetermined condition is met, the setting part sets the manipulation mode of the mobile device based on an initial operation time of the mobile device at the first time after a vehicle battery is remounted or after a terminal of the vehicle battery is reconnected;
 wherein the mobile device comprising:
 a wireless code generating and transmitting part that transmits wireless codes including a start signal and a stop signal, in response to pressing a switch of the mobile device; wherein the setting part sets the manipulation mode of the mobile device, based on a time duration of pressing the switch.

2. The remote control system as claimed in claim 1, wherein the opening operation is a trunk opening operation.

3. The remote control system as claimed in claim 1, the in-vehicle electronic device further comprising:
 a wireless code determination part that determines wireless codes transmitted by the mobile device; wherein
 the setting part calculates the time duration of pressing the switch of the mobile device, based on the determination result of the wireless codes.

4. A remote control system for a vehicle, the system including a mobile device that transmits a signal ordering the vehicle to perform an opening operation and an in-vehicle electronic device that performs the opening operation in response to the signal, the in-vehicle electronic device comprising:
 a determination part that determines whether a manipulation mode of the mobile device should be set, wherein the manipulation mode is one of a long pressing mode and a short pressing mode; and
 a setting part that sets the manipulation mode of the mobile device; wherein when a predetermined condition is met, the setting part sets the manipulation mode of the mobile device based on an initial operation time of the mobile device at the first time after a vehicle battery is remounted or after a terminal of the vehicle battery is reconnected;
 wherein when the manipulation mode is set as the long pressing mode, only one vehicle operation is performed when there is a long pressing manipulation, and no vehicle operation is performed when there is a short pressing manipulation.

5. The remote control system as claimed in claim 4, wherein the opening operation is a trunk opening operation.

6. A remote control system for a vehicle, the system including a mobile device that transmits a signal ordering the vehicle to perform an opening operation and an in-vehicle electronic device that performs the opening operation in response to the signal, the in-vehicle electronic device comprising:
 a determination part that determines whether a manipulation mode of the mobile device should be set, wherein the manipulation mode is one of a long pressing mode and a short pressing mode; and
 a setting part that sets the manipulation mode of the mobile device; wherein when a predetermined condition is met, the setting part sets the manipulation mode of the mobile device based on an initial operation time of the mobile device at the first time after a vehicle battery is remounted or after a terminal of the vehicle battery is reconnected;
 wherein when the manipulation mode is set as the short pressing mode, only one vehicle operation is performed when there is a short pressing manipulation, and no vehicle operation is performed when there is a long pressing manipulation.

7. The remote control system as claimed in claim 6, wherein the opening operation is a trunk opening operation.

* * * * *